DANIEL HRITZAY
*INVENTOR.*

BY Alden D. Redfield
Melvin E. Frederick
ATTORNEYS

Nov. 1, 1966    D. HRITZAY    3,283,276
TWISTED SUPERCONDUCTIVE WINDING ASSEMBLY
Filed July 25, 1963    5 Sheets-Sheet 3

DANIEL HRITZAY
INVENTOR.

BY Alden D. Redfield
Melvin E. Frederick
ATTORNEYS

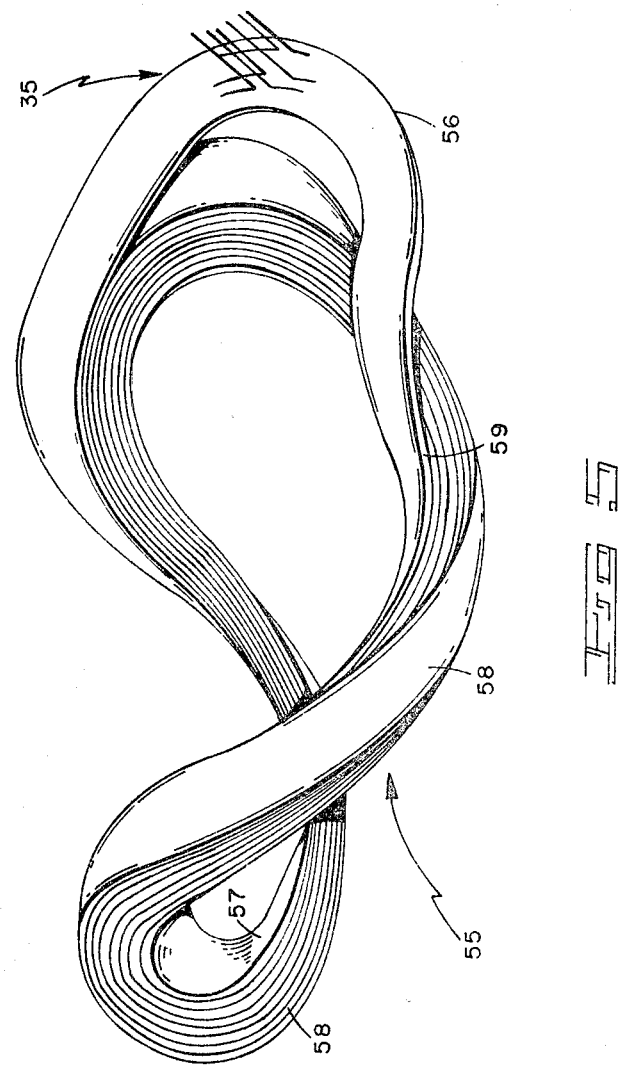

Nov. 1, 1966 D. HRITZAY 3,283,276
TWISTED SUPERCONDUCTIVE WINDING ASSEMBLY
Filed July 25, 1963 5 Sheets-Sheet 5
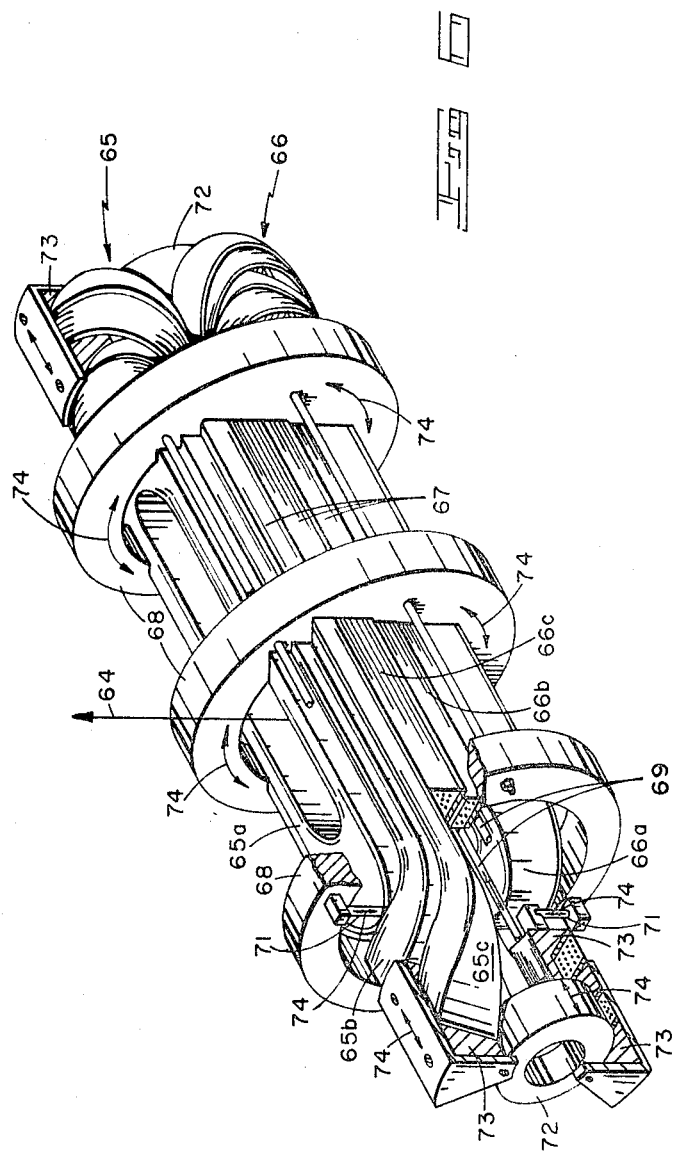
DANIEL HRITZAY
INVENTOR.
BY Alden D. Redfield
Melvin E. Frederick
ATTORNEYS

# United States Patent Office 3,283,276
Patented Nov. 1, 1966

3,283,276
TWISTED SUPERCONDUCTIVE WINDING
ASSEMBLY
Daniel Hritzay, Winchester, Mass., assignor to Avco Corporation, Cincinnati, Ohio, a corporation of Delaware
Filed July 25, 1963, Ser. No. 297,649
10 Claims. (Cl. 335—216)

The present invention relates generally to electrically conductive windings and particularly to superconductive windings and a method of manufacturing same.

In order to facilitate understanding and appreciation of the advantages and novelty of the present invention, a brief discussion of the design and construction of superconductive magnets at this point will be helpful.

The amount of energy stored in some proposed large superconducting magnets is measured in ten's of megajoules. If a magnet storing such tremendous energy becomes normal in an uncontrolled manner, complete destruction of the magnet, as well as its immediate surroundings, is quite likely to result. It is therefore essential that such magnets be fail-safe, i.e., that there be provided protective circuitry to protect such superconducting magnets in the event that they become normal. As disclosed in patent application No. 220,337, filed August 27, 1962, and assigned to the same assignee to which reference is made, high field-strength superconducting magnets may be provided with fail-safe features either singly or in combination, by (1) coating superconducting wire used to wind the magnet with a low resistance material such as copper and then with a high resistance material, (2) providing other low resistance shunt across segments or layers of the magnet to permit the current in each shunt to independently go to zero, and/or (3) providing inductive shields around segments or preferably layers of the coil which tend to maintain the total magnetic flux constant thereby permitting the current in the coil to decay slowly with a minimum energy deposited in the superconducting windings.

In a typical superconducting coil where the inductive coupling between segments of the coil is high, a collective, inductive phenomena may occur when a portion of the coil goes normal. For example, if a portion of the first or innermost layer of a superconducting coil goes normal, the current flow in this layer decays and during the decay transient, the current in the adjacent layer increases due to inductive coupling between these layers. Since the second layer is quite likely operating near its critical current, the current flow therein during the decay transient will increase to its critical value and drive this layer normal. The next adjacent or third layer which previously had been shielded by the second layer from what was happening in the first or innermost layer is suddenly faced with the necessity to triple its current to keep the flux constant. Under these circumstances, the third layer must of necessity go normal and this cumulative process is repeated in all layers of the coil, particularly where only conductive protection circuitry is used.

Accordingly, inductive shields, formed of strips of low resistance, nonmagnetic material, for example, may be provided between layers of the superconducting coil to act as inductive shields to minimize the energy dissipation in the coil itself. Stating it another way, the inductive shields inhibit the above-described increase in the flow of current in the coil due to to inductive coupling during transients. The inductive shield takes up most of the current increase previously required of the layer adjacent a normal region and therefore stops the accumulative, inductive propogation of the normal region.

The requirement that imposes the most severe constraint in the manufacture of superconductive magnets is the requirement for a low resistance, nonmagnetic strip such as copper to be placed between the layers of the coil. While wire can be bent in any direction, the use of conventional winding techniques in the fabrication of saddle-shaped coils and the like results in a scrambled or random location of the wires which not only results in a poor packing factor, but in the case of superconducting coils, renders it impossible to provide protective inductive circuitry.

Protective inductive circuitry and high packing efficiency are most easily obtained if the coil is comprised of a plurality of strip-like layers wherein the wires comprising each layer lie in a well-defined geometrical pattern rather than a random pattern. As noted above, known techniques for winding coils and particularly saddle-shaped coils and the like do not admit of a satisfactory solution to the requirement of inductive protective circuitry in superconducting coils.

Although superconductive material in the form of a continuous strip of any desired length would provide a simple solution to the manufacture of superconducting coils, the provision of superconductive material in this form is, unfortunately, beyond present day capabilites. Superconductive material suitable for the manufacture of coils is presently available only in the form of wire having typically a diameter of .010 inch and random lengths of up to typically 10,000 feet. Further, the cost of such uncoated wire is about three hundred dollars ($300.00) per pound and about four hundred dollars ($400.00) per pound if plated with copper which is in turn covered with an insulating material suc has nylon.

As will now be obvious, superconducting windings having major dimensions of several feet and a weight of 200 pounds or more must be manufactured of wire and in order to provide protective circuitry, such superconducting windings must be fabricated such that the turns comprising each layer of the winding are contiguously aligned in side-by-side relationship.

With the foregoing in mind, it will be readily evident that a superconducting coil should have such desirable characteristics as high efficiency, a high packing factor, and be amenable to a simple and economical method of manufacture which permits the incorporation of protective circuitry in the construction of saddle-shaped coils and the like.

It is, therefore, an object of the present invention to provide superconducting coils and a method of manufacturing such coils which do not have the deficiencies and limitations inherent in the prior art.

It is another object of the present invention to provide a method of manufacturing superconducting coils which is easily and simply practiced and which permits the incorporation of protective circuitry.

It is a further object of the present invention to provide an endless winding of superconducting wire and a method of manufacturing such windings for use in manufacturing superconducting coils.

It is a still further object of the present invention to provide a winding and a method of manufacturing such a winding for use in manufacturing superconducting coils which include protective circuitry and wherein all connections to the winding and terminals in the windings are conveniently located and readily available.

It is a still further object of the present invention to provide a simple and inexpensive superconducting coil as compared to prior art superconducting coils wherein all connections and terminals are located in an exposed and easily accessible part of the coil.

In accordance with the present invention, a winding and method of manufacturing such a winding for use in forming a superconducting coil comprises the provision of a plurality of turns of a superconductive conductor contiguously and fixedly aligned with respect to each other to form a flexible endless winding and a strip of low resistance and nonmagnetic material bonded to a surface of the endless winding. Where more than one spool of superconducting wire is required to form the endless winding, the end portions of the first wire and the beginning and end portions of all succeeding wires are disposed in a predetermined region of the endless winding. Upon completion of the winding, it is then wound on itself to form a coil having a central opening and a plurality of layers, beginning preferably at a point on the winding such that the aforementioned region containing the end portions of the wire or wires is located in an exposed surface of the winding. Preferably, the winding is provided with one 360° twist for every layer of the coil. Thus, when the coil is completed, there will be no net twists in the portion of the winding which connects the first and last layers of the coil and crosses over the remaining layers of the coil. Further, this crossover portion of the winding preferably contains the end portions of the wire or wires forming the belt.

The invention, both as to its organization and method of operation, will best be understood from the following description of the specific embodiments when read in conjunction with the accompanying drawings, in which:

FIGURE 5 is a perspective view of an endless winding having a saddle-shaped configuration; and FIGURE 6 is a diagrammatic perspective view of supporting structure for saddle-shaped windings.

Figure 1:
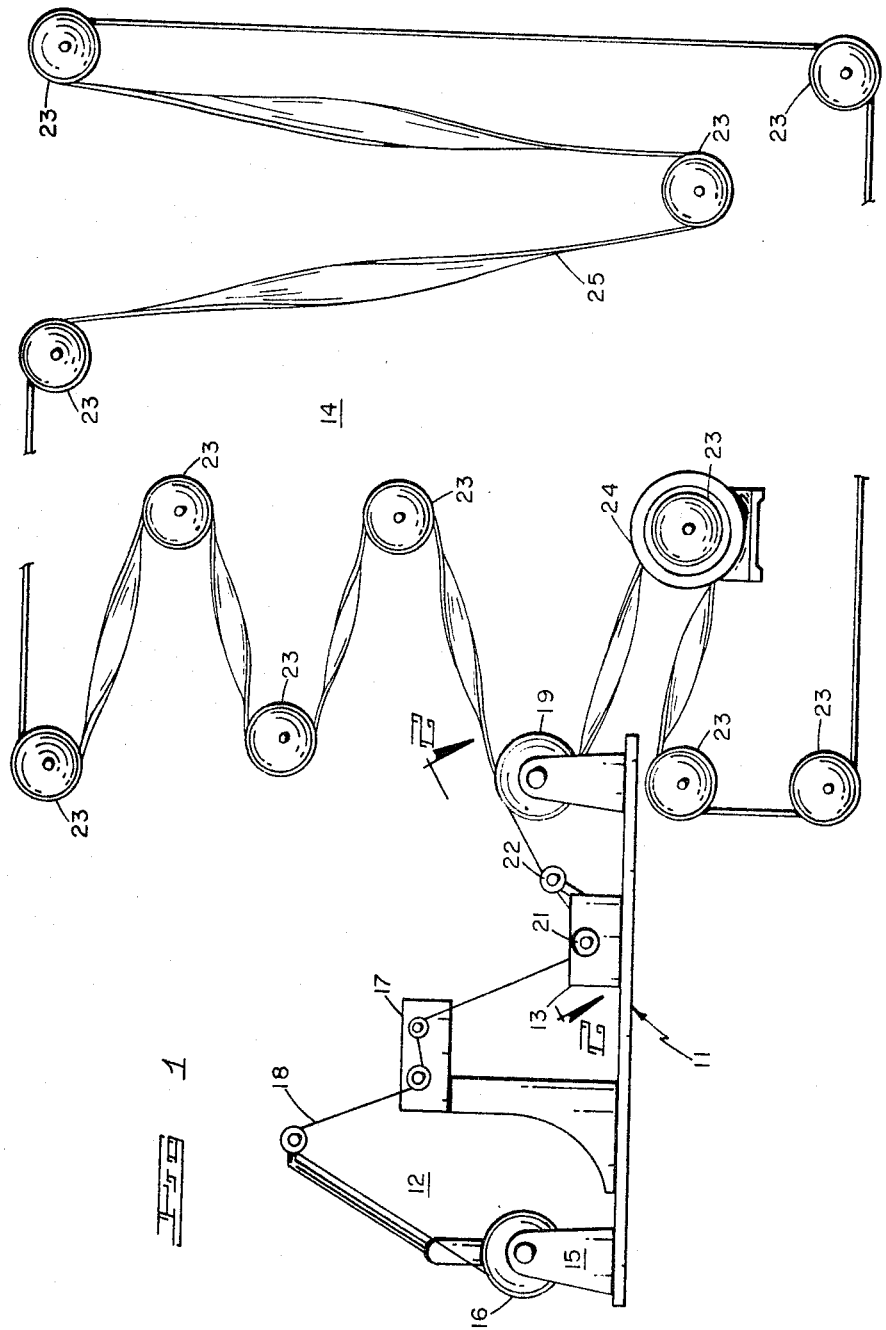
FIGURE 1 is a diagrammatic side view illustrating one way of making an endless winding in accordance with the present invention.

In FIGURE 1, there is shown winding mechanism for producing a winding in accordance with the present invention. The winding mechanism may be of conventional and well-known design which as shown includes a winding table portion 11 including the wire supply system generally designated 12 and transverse wire feed generally designated 13. A belt storage portion is generally designated 14. The wire directing system includes supporting arms 15 for the supply reel 16, a brake 17 of conventional design for controlling wire tension by applying a retarding force to the wire 18, transverse wire feeding apparatus 13, and a rotatable winding head 19 for receiving the wire from the transverse wire feeding apparatus 13. All of the aforementioned elements are of well known and conventional design and are used in conventional manner. Accordingly, free rotation of the supply reel 16 may be restrained by any standard friction brake and the desired wire tension may, for example, be provided by an electrically controlled magnetic brake that applies a retarding force to the wire via a spring-loaded capstan, all in conventional manner. The wire 18 is traversed across the winding head 19 at the rate of one wire diameter for every complete revolution of the winding in the storage portion 14. Such traversing means may comprise in well-known manner a lead screw 21 driven through a suitable gear train (not shown) by rotation of the winding head 19. The lead screw 21 supports the rotatable guide 22.

The storage portion 14 for the winding is comprised in well-known manner of a plurality of rotatable winding support means such as, for example, pulley wheels 23 carried by a rigid frame (not shown). The storage portion 14 functions principally to store the winding during the winding operation and is shown in FIGURE 1 as a folded system to reduce the space necessary to handle long windings. Suitably located pulley wheels may be driven in well-known manner by a variable speed drive via a chain drive system (not shown). The driven pulley wheels are preferably driven through friction clutches to prevent excessive forces on the winding in case of a mechanical stoppage. During the winding operation, tension in the winding is most conveniently controlled by mechanically adjusting the position of one or more of the conveyor pulleys as by a jack screw or the like. The system may also be provided with a magnetic clutch 24 to allow localized control of tension in the winding at a point adjacent the winding head 19. The winding is most conveniently formed on an endless conveyor belt 25 which is stored on the pulley wheels 23 and winding head 19.

Directing attention now to the conveyor belt 25, it will be noted as shown in FIGURE 1 that the conveyor belt is twisted 180° between some but not all of the pulley wheels 23. This is necessary in a folded storage system to permit the wire 18 to be wound on the conveyor belt 25 without coming into contact with the pulley wheels 23. Accordingly, the same major surface in the width direction of the conveyor belt always contacts the pulley wheels.

The conveyor belt 25 is preferably made from blue steel strip stock which is threaded around the pulley wheels 23 in the storage portion 14 and around the winding head 19. The conveyor belt is twisted 180° at the appropriate pulley wheels and thereafter the ends of the conveyor belt are spot welded together and annealed to make a continuous conveyor belt. Such a conveyor belt is referred to herein as a permanently twisted conveyor belt. Obviously, wire helically wound on the conveyor belt will also be provided with the same number of permanent twists as exists in the conveyor belt.

After the endless conveyor belt has been mounted on the pulley wheels and winding head, a nonhardening adhesive is applied to the exposed major surface 26 of the conveyor belt, i.e., the surface which does not come into contact with the pulley wheels. Commercially available paper-backed adhesive in strip form is recommended because of the ease and simplicity with which it may be used. An added advantage of the use of such an adhesive is that substantially all of its remains on the belt when the winding is removed, thereby resulting in a savings in packing factor in a finished coil.

Figure 2:
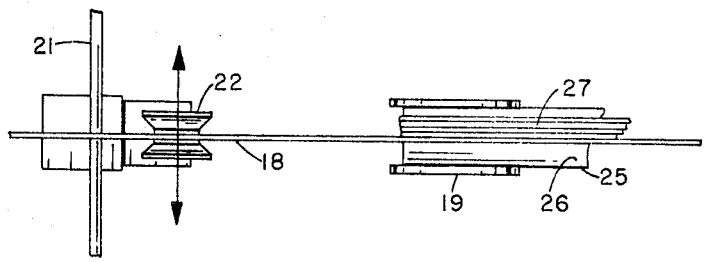
FIGURE 2 is a fragmentary top view of a portion of the winding mechanism taken on line 2—2 of FIGURE 2.

After application of the adhesive, the superconducting wire 18 from the supply reel 16 is applied to and helically wound on the conveyor belt to form the winding 27 as shown in FIGURE 2. The wire, which is quite stiff, is held in place on the conveyor belt by the adhesive.

Present day superconductive wire satisfactory for construction of superconductive coils is of the niobium-zirconium type. Since such superconductive wire has characteristics quite similar to that of piano wire, the use of an endless conveyor belt made of blue steel coated with an adhesive is recommended.

In theory, the endless winding can have only two wire ends or terminals. However, the limited length of wire presently available will result in several pairs of wire ends that require superconducting connections in the endless winding. For instance, an endless winding 500 feet in circumference and having 110 turns would require about 55,000 feet of wire. It has been previously pointed out that the present state of the art, in producing superconducting wire, produces wire in average lengths of about 10,000 feet. Accordingly, about six spools of wire would be needed to fabricate such a winding and therefore would require about five or six superconducting connections to provide a single continuous superconductive circuit. Each wire or conductor is therefore preferably terminated in a predetermined region 35 of the winding in the manner shown in FIGURE 3 such that the end portions 36 of all of the conductors are essentially located at the same place in the finished winding. As more fully pointed out hereinafter, the aforementioned region 35 containing the end portions 36 of the conductors is preferably located in an exposed and hence easily accessible portion of a coil formed from the winding.

As best shown in FIGURE 2, the winding at this stage is comprised of one or more conductors serially and helically wound on the conveyor belt 25. Accordingly, the turns comprising the winding 27 are contiguous and aligned one with another. Of course if a single supply spool contains sufficient wire, superconducting connections will not be required. However, for large windings requiring more than one spool of wire such as, for example, a winding having a circumference sufficient to provide a predetermined number of layers in a completed coil, the first spool of wire may be helically wound on the belt until it runs out as at 37 in FIGURE 3. Thereafter, the next spool of wire 18 is begun on the conveyor belt at the point 37 where the first conductor ends and the second and all subsequent conductors are preferably terminated near this point so that all end portions 36 of the conductors terminate in essentially the same region of the winding. It will now be seen that such a winding in accordance with the present invention comprises a plurality of contiguously aligned turns of a plurality of helically wound consecutive conductors that form a permanently twisted endless winding having two oppositely disposed and generally flat major surfaces 38 and 39 in the width direction of the winding, i.e., in the direction normal to the direction of the wires forming the belt.

After the desired number of turns have been wound on the conveyor belt, a suitable electrically nonconducting potting material is applied to the exposed major surface of the winding to bond the turns one to another. Although the type of potting material is not critical or for that matter even essential, it should have good thermal shock resistance, it should be flexible at room temperature, it should have a low thermal coefficient of expansion such that distortion at superconducting temperatures and subsequent stresses will be minimized, and it should have a high electrical resistance at all temperatures. A potting material that has been used successfully is thermosetting epoxy resin with an alumina filler to give a low coefficient of expansion. Such a material is commercially available as Spycast 2850 Ft. sold by Emerson and Cuming of Canton, Massachusetts.

Figure 4:
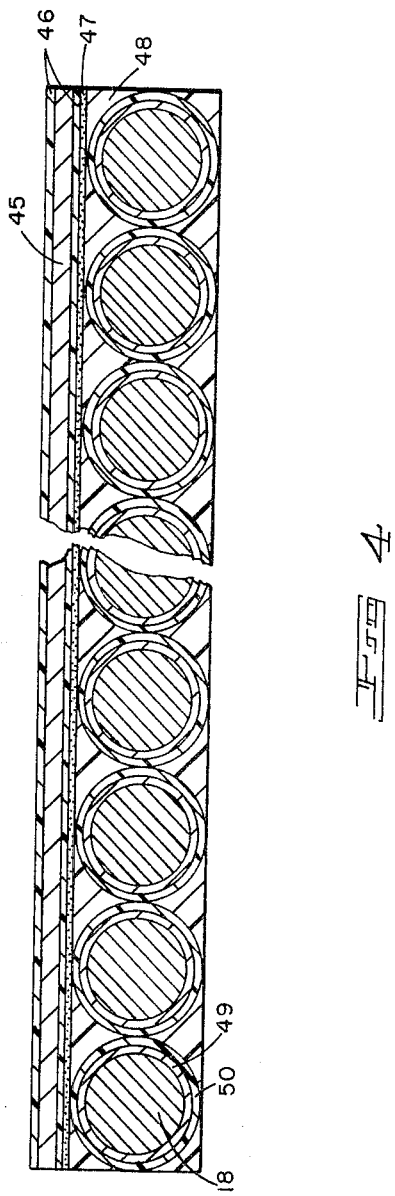
FIGURE 4 is taken on line 4—4 of FIGURE 3.

Directing attention now to FIGURE 4, after the potting material 48 has been applied, a low resistance and nonmagnetic strip 45 of, for example, copper having a thickness of about two mils, a width and length equal to that of the winding, and coated with an insulating material 46 such as Teflon is bonded as by an adhesive 47 to the exposed major surface of the winding to provide protective circuitry in the form of a closed electrical circuit. A convenient method of bonding the aforementioned strip 45, which comprises inductive shields between the layers of an assembled coil, is to apply the adhesive 47 to one surface of the strip 45 and then bring this surface into contact with the winding. The provision of the aforementioned strip not only provides protective circuitry in a completed coil but also helps hold the turns of the winding together. While the strip 45 is preferably applied before the winding is removed from the conveyor belt, it may, if desired or necessary, be applied thereafter by transferring the winding to a large diameter collecting drum (not shown) having a diameter such that the twists in the winding are removed when the winding is placed on the drum. In this case, the strip may be applied to the winding as the winding is transferred to the collecting drum.

The selection of the size of the pulley wheels is important with respect to the application of the strip 45 to the winding. If the diameter of the pulley wheels is too small, the strip will be sufficiently strained when passing over the pulley wheels to yield, thereby resulting in buckles in the finished product. Accordingly, care should be taken in the selection of the pulley wheels in the construction of the storage rack. However, as noted above, the strip 45 may be applied after the winding has been removed from the conveyor belt if the strip cannot be satisfactorily applied during the winding operation.

If the winding is formed on an untwisted conveyor belt, it may be completely separated from the conveyor belt by a simple stripping operation. However, if the winding is formed on a permanently twisted conveyor belt, the winding and the conveyor belt cannot be completely separated unless the conveyor belt is first entirely cut in its width direction.

Figure 3:
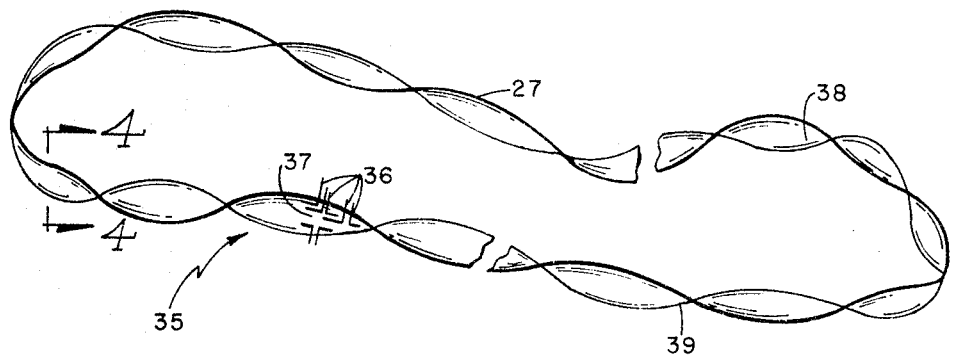
FIGURE 3 is a perspective view of a permanently twisted endless winding.

The strength of the winding may be further increased if potting material 45 is applied to the underside of the winding as or after it is removed from the conveyor belt. FIGURE 3 shows a permanently twisted endless winding 27 and FIGURE 4 is a sectional view of the winding on a greatly enlarged scale. As shown in FIGURE 4, the turns of the superconducting wire 18 coated first with copper 49 and then with insulation 50 are encapsulated in the potting material 48. The adhesive 47 bonds the copper strip 45 coated with insulation 46 to the upper major surface of the winding.

A saddle-shaped coil generally designated by the numeral 55, i.e., one having a configuration other than that of a simple surface of revolution, formed in accordance with the present invention is shown in FIGURE 5. If one takes an untwisted endless winding and proceeds to wind it on itself to provide a plurality of layers, as shown in FIGURE 5 for example, the winding will twist 360° in its longitudinal direction for each layer so provided. Therefore, when the coil is finished, a portion 56 of the winding will connect the first and last layers 57 and 58 of the coil as shown in FIGURE 5, but will contain the same number of 360° twists as there are layers in the coil. Accordingly, to prevent the existence of twists in the crossover portion 56 of the winding, the winding should be provided during the winding operation with as many permanent twists (by providing a twisted conveyor belt) as the number of layers desired in the finished winding to provide an untwisted crossover portion as shown in FIGURE 5. In the event that it is not possible to do this because of practical limitations, the crossover portion may be packaged in a length of tube or the like (not shown). This, however, is undesirable because it results in the existence of a magnetic field separate from the main field and according, a reduction in the maximum field possible with a winding of given circumference. Removal of the twists is simply accomplished. If the winding is wound in the wrong direction (depending on the directions of the permanent twists in the winding which should all be in the same direction) the twists in the winding will not decrease.

If the formation of the coil is begun adjacent to the end portions 36 of the conductors such as, for example, at 59 of FIGURE 5, the end portions of the conductors will be located in the crossover portion 56 of the winding and thereby facilitate their interconnection to provide, for example, a single continuous superconductive circuit. Since the application of heat in any significant degree effectively destroys necessary superconductive characteristics of present day superconductive wire, the connection of the end portions 36 of the conductors should be accomplished with mechanical pressure type connectors. A suitable connector is disclosed in patent application Serial Number 270,925, filed April 5, 1963, and entitled Superconductive Connector, now Patent No. 3,200,368, issued August 10, 1965. While location of the end portions of the conductors is preferably in the crossover portion, they may also be located in any portion of a major surface that is exposed. If the end portions are not located in the crossover portion of the winding, it may be necessary to bring the end portions of the conductors out between the turns and the electrically conductive strip bonded thereto.

It will now be appreciated that the present invention is most useful in the fabrication of superconductive coils which provide high-strength magnetic fields. The large diameter of saddle-shaped coils and the like, for providing large magnetic fields, leads to large forces that must be resisted by the winding and its associated supporting structure to prevent deformation of the winding. For example, the pressure of a 40,000 gauss coil is approximately 1,000 pounds per square inch. This pressure tends to expand the coil in all directions perpendicular to the major magnetic field vector indicated by the arrow 64 in FIGURE 6 and to compress the coil in the direction parallel to the major magnetic field vector 64. In conventional cylindrical coils, these forces result in radial expansive forces and axial compressive forces. The conventional solution to the structural problem in cylindrical coils is to place a band or bands around the winding which, together with the winding itself, resists the radial forces and to provide means including conventional compression members to resist the axial forces.

In the fabrication of coils, coil forces may be obtained from magnetic field plots. In this approach, the coil is considered to comprise current bundle and the net forces integrated over the length of the current conducting elements.

FIGURE 6 illustrates schematically supporting structure for a saddle-shaped coil. The purpose of the supporting structure is to transfer the loads on the windings so that the bending and shear loads on the winding can be eliminated. As shown in FIGURE 6, the coil is saddle-shaped and comprised of two oppositely disposed portions 65 and 66 each comprised of three segments 65a–65c and 66a–66c adapted to enclose a generally cylindrical volume. On the straight sides 67 of the windings, the outwardly directed loads normal to the major magnetic field vector 64 are transferred to the heavy metal rings 68 and these same loads on the crossover-portions at the opposite ends of the coil are balanced through tension elements 69. These loads on the crossover portions at one end of the coil are equal and opposite to the loads on the crossover portions at the opposite end of the coil.

The compressive forces on the straight sides of the segments of the coil are resisted by the rigidity of the segments themselves and the compressive forces at the crossover area are resisted by heavy internal cylinders 72 via a series of blocks 73 that intimately contact the segments in the crossover area. In addition to the internal support provided by the internal cylinders 72, additional members may be provided to transmit some of this load to the end rings via tension members 71.

The arrows 74 in FIGURE 6 indicate the direction of the major load paths in the various parts which comprise the supporting structure.

The various features and advantages of the invention are thought to be clear from the foregoing description. Various other features and advantages not sepecifically enumerated will undoubtedly occur to those versed in the art, as likewise will many variations and modifications of the preferred embodiment illustrated, all of which may be achieved without departing from the spirit and scope of the invention as defined by the following claims.

I claim:
1. An electrical winding for use in forming electrical coils having a plurality of layers of a superconductive conductor comprising:
   (a) a plurality of consecutive, contiguous and aligned turns of at least one superconductive conductor forming an endless belt closed on itself, said belt defining first and second major surfaces in the width direction and having a circumference greater than the total circumference of each of said plurality of layers; and
   (b) a strip of low resistance and nonmagnetic material covering said first surface, said strip having a width and length substantially equal to respectively the width and circumference of said belt.
2. An electrical winding comprising:
   (a) a plurality of consecutive, contiguous and aligned turns of at least one superconductive conductor forming a permanently twisted endless belt, said belt defining first and second major surfaces in the width direction and having a circumference sufficient to provide a plurality of layers of said belt; and
   (b) a strip of low resistance and nonmagnetic material covering said first surface, said strip having a width and length substantially equal to respectively the width and circumference of said belt.
3. An electrical winding comprising:
   (a) consecutive, contiguous and aligned turns of a plurality of superconductive conductors forming an endless belt closed on itself, said belt defining first and second major surfaces in the width direction and having a circumference sufficient to provide a plurality of layers of said belt, the end portions of said conductors being located in a predetermined region of said belt; and
   (b) a strip of low resistance and nonmagnetic material covering said first surface, said strip having a width and length substantially equal to respectively the width and circumference of said belt.
4. An electrical winding comprising:
   (a) consecutive, contiguous and aligned turns of a plurality of superconductive conductors forming a permanently twisted endless belt, said belt defining first and second major surfaces in the width direction and having a circumference sufficient to provide a plurality of layers of said belt, the end portions of said conductors being located in a predetermined region of said belt; and
   (b) a strip of low resistance and nonmagnetic material covering said first surface, said strip having a width and length substantially equal to respectively the width and circumference of said belt.
5. An electrical winding comprising:
   (a) consecutive, contiguous and aligned turns of a plurality of superconductive conductors forming a permanently twisted endless belt, said belt defining first and second major surfaces in the width direction and having a circumference sufficient to provide a plurality of layers of said belt, the end portions of said conductors being located in a predetermined region of said belt and the number of said twists being substantially equal to the number of layers of said belt; and
   (b) a strip of low resistance and nonmagnetic material covering said first surface, said strip having a width and length substantially equal to respectively the width and circumference of said belt.
6. An electrical winding comprising:
   (a) a plurality of consecutive, contiguous and aligned turns of at least one insulated superconductive conductor forming an endless belt having a plurality of permanent twists, said belt defining first and second major surfaces in the width direction and having a circumference sufficient to provide a plurality of layers of said belt;
   (b) means carried by at least one of said surfaces for bonding said turns one to another; and
   (c) a strip of low resistance and nonmagnetic material covering said first surface, said strip having a width and length substantially equal to respectively the width and circumference of said belt.
7. An electrical winding comprising:
   (a) a plurality of consecutive, contiguous and aligned turns of at least one superconductive conductor forming an endless belt closed on itself, said belt defining first and second major surfaces in the width direction and having a circumference sufficient to provide a plurality of layers of said belt, the ends of said conductor being located in a predetermined region of said belt; and (b) a strip of low resistance and nonmagnetic material covering said first surface, said strip having a width and length substantially equal to respectively the width and circumference of said belt, said belt further defining a central opening and said plurality of layers, the said ends of said conductor being located in an exposed portion of a major surface of said belt.

8. An electrical winding comprising:

(a) a plurality of consecutive, contiguous and aligned turns of at least one superconductive conductor forming an endless belt having a plurality of permanent twists, said belt defining first and second major surfaces in the width direction and having a circumference sufficient to provide a plurality of layers of said belt, the ends of said conductor being located in a predetermined region of said belt; and (b) a strip of low resistance and nonmagnetic material covering said first surface, said strip having a width and length substantially equal to respectively the width and circumference of said belt, said belt further defining a central opening and said plurality of layers without substantially any twists, the said ends of said conductor being located in an exposed portion of a major surface of said belt.

9. An electrical winding comprising:

(a) a plurality of contiguous and aligned turns of a plurality of consecutive superconductive conductors forming an endless belt having a plurality of permanent twists, said belt defining first and second major surfaces in the width direction and having a circumference sufficient to provide a plurality of layers of said belt, the ends of said conductors being located in a predetermined region of said belt; and (b) a strip of low resistance and nonmagnetic material covering said first surface, said strip having a width and length substantially equal to respectively the width and circumference of said belt, said belt further defining a central opening and said plurality of layers without substantially any twists, the said ends of said conductors being located in an exposed portion of a major surface of said belt.

10. An electrical winding comprising:

(a) a plurality of contiguous and aligned turns of a plurality of consecutive superconductive conductors forming an endless belt having a plurality of permanent twists substantially equal to the number of said layers, said belt defining first and second major surfaces in the width direction and having a circumference sufficient to provide a plurality of layers of said belt, the ends of said conductors being located in a predetermined region of said belt, one end each of at least two of said conductors being in electrical contact one with another to provide a single continuous superconductive circuit; and (b) a strip of low resistance and nonmagnetic material covering said first surface, said strip having a width and length substantially equal to respectively the width and circumference of said belt, said belt further defining a central opening and said plurality of layers without substantially any twists, the said ends of said conductors being located in the portion of said belt connecting the first and last layers of said winding and crossing over the remaining layers of said belt.

References Cited by the Examiner
UNITED STATES PATENTS

| | | | |
|---|---|---|---|
| 2,691,811 | 10/1954 | Wagar | 29—155.57 |
| 2,848,794 | 8/1958 | Roth | 29—155.57 |
| 3,102,973 | 9/1963 | Kunzler | 317—158 |
| 3,158,793 | 11/1964 | Swartz | 317—158 |
| 3,187,235 | 6/1965 | Berlincourt et al. | |
| 3,205,413 | 9/1965 | Anderson. | |

BERNARD A. GILHEANY, *Primary Examiner.*

JOHN F. BURNS, *Examiner.*

G. HARRIS, JR., *Assistant Examiner.*